United States Patent
Wenzel et al.

(10) Patent No.: US 8,353,084 B2
(45) Date of Patent: Jan. 15, 2013

(54) CONNECTOR DEVICE ON A RETAINER DEVICE FOR A COVER OF AN OPENABLE VEHICLE ROOF

(75) Inventors: Reinhard Wenzel, Munich (DE); Dominik Hölzel, Gröbenzell (DE)

(73) Assignee: Webasto SE, Stockdorf (DE)

( * ) Notice: Subject to any disclaimer, the term of this patent is extended or adjusted under 35 U.S.C. 154(b) by 775 days.

(21) Appl. No.: 12/373,625

(22) PCT Filed: Jul. 12, 2007

(86) PCT No.: PCT/DE2007/001239
§ 371 (c)(1),
(2), (4) Date: Sep. 9, 2009

(87) PCT Pub. No.: WO2008/006353
PCT Pub. Date: Jan. 17, 2008

(65) Prior Publication Data
US 2010/0005623 A1    Jan. 14, 2010

(30) Foreign Application Priority Data
Jul. 14, 2006   (DE) .................. 10 2006 032 700

(51) Int. Cl.
*E05D 15/00* (2006.01)
(52) U.S. Cl. .......... 16/368; 16/2.1; 16/223; 296/216.01; 296/223
(58) Field of Classification Search .............. 16/368, 16/369, 92, 2.1, 223; 296/216.01, 221–222, 296/216.03, 216.04, 216.05, 223, 216.08, 296/216.02
See application file for complete search history.

(56) References Cited

U.S. PATENT DOCUMENTS

| | | | | |
|---|---|---|---|---|
| 4,005,901 A * | 2/1977 | Lutke et al. | | 296/218 |
| 5,261,722 A * | 11/1993 | Staley et al. | | 296/211 |
| 5,833,300 A * | 11/1998 | Russke | | 296/108 |
| 6,623,070 B2 * | 9/2003 | Armbruster | | 296/216.04 |
| 6,698,826 B2 * | 3/2004 | Doll et al. | | 296/216.08 |
| 7,216,928 B2 * | 5/2007 | Braun | | 296/223 |
| 7,258,397 B2 * | 8/2007 | Braun et al. | | 296/223 |

FOREIGN PATENT DOCUMENTS

| | | |
|---|---|---|
| DE | 3532679 | 11/1986 |
| DE | 20023526 | 8/2004 |
| DE | 10309593 | 9/2004 |
| DE | 10320820 | 12/2004 |
| DE | 102004050609 | 3/2006 |
| EP | 1254800 | 11/2002 |

OTHER PUBLICATIONS

International Search Report dated Dec. 6, 2007.

* cited by examiner

*Primary Examiner* — William L. Miller
(74) *Attorney, Agent, or Firm* — Fitch, Even, Tabin & Flannery LLP

(57) ABSTRACT

The invention relates to a connector device for a retainer device (2) on a cover of an openable vehicle roof on an operating mechanism, in particular, on an operating lever (3) with a bearing pin (4), comprising a mid axis (104), about which the operating lever (3) is mounted to pivot relative to the cover, characterized in that the bearing pin (4) is mounted to rotate relative to the operating lever (3) and has a housing device (10, 13) for the retainer device (2) in a region facing the vehicle inner side (111), wherein the retainer device (2) is connected with fixing means (22) to the housing device (10, 13) in an axially and rotationally fixed manner relative to the bearing pin (4).

12 Claims, 4 Drawing Sheets

CONNECTOR DEVICE ON A RETAINER DEVICE FOR A COVER OF AN OPENABLE VEHICLE ROOF

This application is a 35 U.S.C. §371 National Stage entry of PCT/DE2007/001239, filed Jul. 12, 2007, which claims priority from German Patent Application No.: 10 2006 032 700.4, filed Jul. 14, 2006.

TECHNICAL FIELD

The invention relates to a connector device on a retainer device for a cover of an openable vehicle roof.

BACKGROUND

DE 103 09 593 A1 discloses a cover for a vehicle roof and a method of production therefore. Such a cover is, for example, suitable to be connected by the connector device according to the invention to an adjustment mechanism of an openable vehicle roof. For this purpose, the cover has cover holders. Furthermore, the cover has a lateral panel which, in the fitted state, projects downward and is intended to visually cover the fastening points of the cover to the adjustment mechanism.

According to the applicant's own prior art, covers of this type customarily have two fastening holes per cover holder. Such modified covers are usually connected by a connector device, as illustrated schematically in FIGS. 3 and 4, to the adjustment mechanism, in particular to the kinematic actuating mechanism of the openable vehicle roof. FIG. 3 illustrates, in a perspective illustration, part of an actuating lever 100 of a kinematic actuating or adjustment mechanism of an openable vehicle roof. The actuating lever 100 has a free end 101. A fastening pin 103 extends from the free end 101 in a direction 102 toward the central longitudinal plane of the vehicle. The fastening pin 103 sits in a rotationally fixed manner in the actuating lever 100. A plastic bush 105 is arranged rotatably about a central axis 104 on the fastening pin 103. The plastic bush 105 is connected in a form-fitting manner to a retaining plate 106. The retaining plate 106 has fastening openings 107 into which a suitable fastening means 112, for example a screw, can be inserted for connection to a retainer device 108 for the roof cover. The retainer device 108 is, for example, an angled region of an inner cover panel and sits, as seen in the transverse direction 102 of the vehicle, between the actuating lever 100 and the retaining plate 106. Such an arrangement requires a screwed installation in an installation direction 109 from an outside 110 of the vehicle toward the inside 111 of the vehicle.

It is clear in particular from FIG. 4 that, in the case of an installation direction 109 from the outside 110 of the vehicle to the inside 111 of the vehicle, a polyurethane foam cladding or a visible panel 113 which extends downward from the cover in order to visually conceal the connecting points of the cover to the adjustment mechanism is a nuisance. This problem has hitherto been solved by the polyurethane foam cladding of the cover being interrupted in the region of the fastening or retainer devices 108 and, instead of the polyurethane foam cladding, use being made of a plastic panel which can be removed for the purpose of installation and, if appropriate, removal in order to ensure access to the screw heads. A further solution approach is to omit the plastic panel 113 and to design the polyurethane foam cladding, which is to be provided in the region of the retainer devices 108, to be thin enough such that it can be deformed during the screwing operation, i.e. can be bent away elastically upward, in order to allow access to the screws 112. The prior art connector device described above has the disadvantage of requiring relatively long installation times for installing the cover on the kinematic adjustment mechanism, since either the thin polyurethane foam cladding has to be bent upward in the region of the connecting points, in order to allow access to the screws, or the plastic panel has to be inserted afterwards as a separate part. Both variants result in an unsatisfactory visual impression since, in the case of a thin polyurethane foam cladding in the region of the connecting points, there is the risk that the bending upward of the foam cladding will lead to said foam cladding no longer being entirely returned to its initial state and remaining rippled. The use of a plastic panel has the disadvantage that the visible surface has to be coordinated at a cost so that as little difference as possible can be perceived between the plastic panel and the adjoining polyurethane foam cladding region. However, visual lines continue to remain interrupted. In addition, the provision of a plastic panel is cost-intensive, since an additional component is required. Apart from the factors mentioned above, there is also the need to simplify the construction of the connector device and in particular to reduce the weight thereof. At the same time, simple installation is to be made possible, with, in particular, the visual impression in the region of connecting points of a cover to the adjustment mechanism being improved.

This object is achieved by a connector device having the features of various embodiments presented herein. Advantageous embodiments are specified in the dependent claims.

In the case of the connector device according to the invention, it is advantageous in particular that one installation direction, in particular a screwing direction from the inside of the vehicle to the outside of the vehicle, is provided such that a continuous covering panel can be provided extending downward from the cover in order to visually conceal the connecting points. For example, the polyurethane foam cladding can be guided past the connecting point at a uniform thickness such that, firstly, a plastic panel can be omitted and, secondly, the polyurethane foam cladding is sufficiently stable even at this point that no undesirable ripples occur. It is furthermore advantageous that the retaining plate used hitherto can be omitted and is preferably replaced by a washer which is simple to produce and is substantially lighter in weight. Furthermore, it is provided to fasten a retainer device for a cover for an openable vehicle roof directly to a bearing pin of the connector device, particularly preferably concentrically with respect to the central axis of said bearing pin. A particularly appropriate bearing pin in this connection is one which has a central passage opening with an internal thread into which a fastening screw can be screwed. The fastening screw holds the retainer device for the cover in a rotationally fixed and axially fixed manner with the use of a washer. The bearing pin is mounted rotatably with regard to an actuating lever of the adjustment mechanism and, in a particularly preferred embodiment, is inserted captively in the actuating lever, in particular is wobble-riveted with the use of a washer.

BRIEF DESCRIPTION OF THE DRAWINGS

The invention is explained in more detail below by way of example with reference to FIGS. 1 and 2, in which.

DETAILED DESCRIPTION

Figure 1:
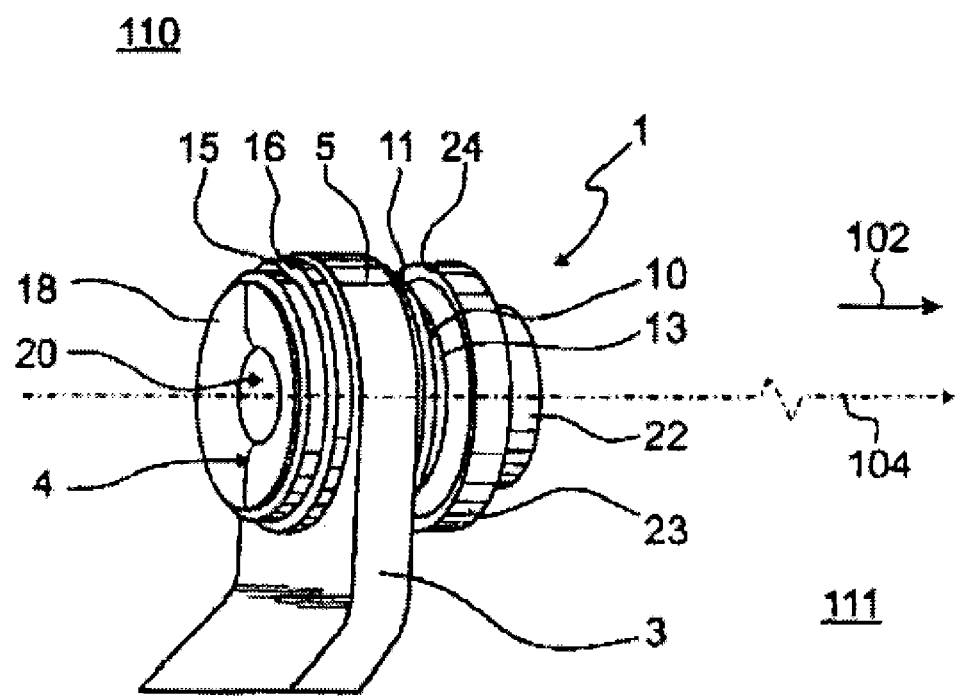
FIG. 1 shows a perspective view of a connector device according to the invention.
Figure 2:
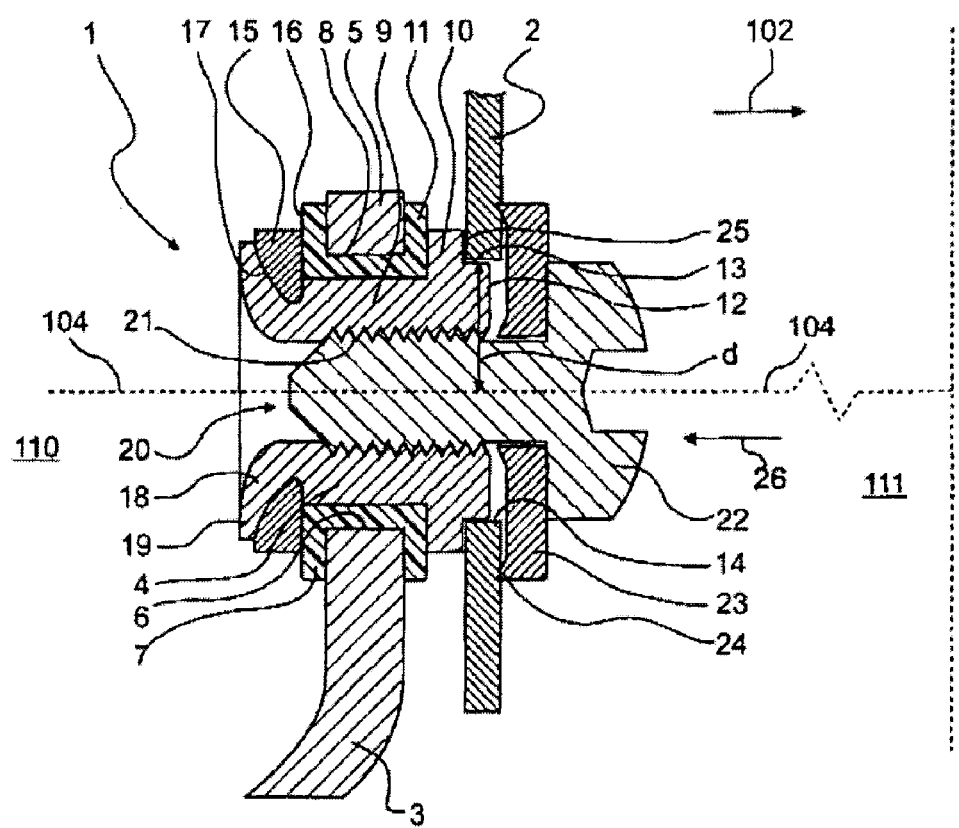
FIG. 2 shows a cross section in the region of a central axis through the connector device according to the invention from FIG. 1.
Figure 3:
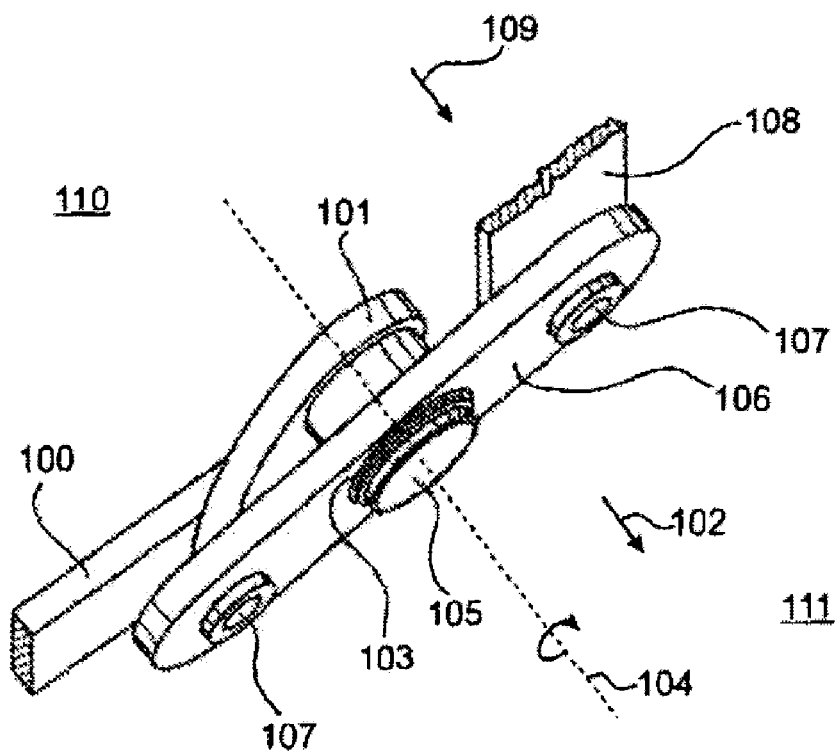
FIGS. 3 and 4 show a connector device according to the prior art.
Figure 4:
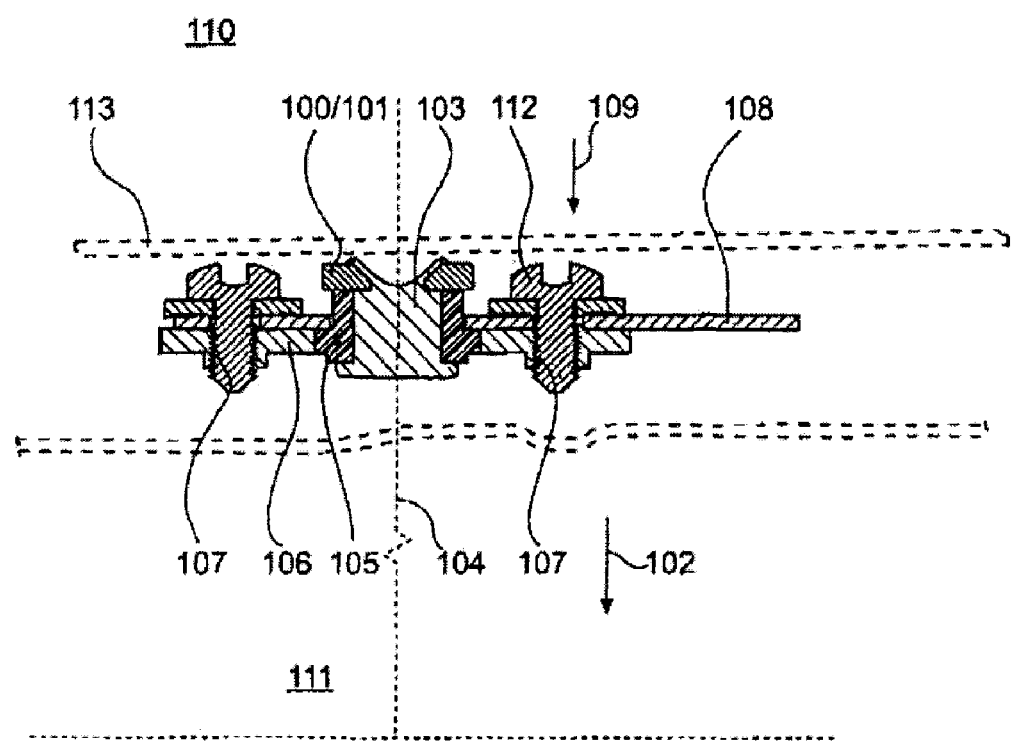

An embodiment according to the invention of a connector device 1 according to FIGS. 1 and 2 on a retainer device 2 for a cover of an openable vehicle roof to a kinematic actuating mechanism, in particular to an actuating lever 3, has a bearing pin 4 with a central axis 104, about which the actuating lever 3 is mounted pivotably relative to the cover. In this case, the retainer device 2 is connected fixedly to the cover (not shown). At its free end 5, the actuating lever 3 has a recess 6 which likewise has the central axis 104.

In the recess 6 there is an anti-friction layer 7 which is of U-shaped design in cross section and is designed as an internal injection-molded encapsulation of the recess 6. The bearing pin 4 is inserted with an anti-friction surface 8 rotatably with regard to the actuating lever 3 about the central axis 104.

The bearing pin 4 has a cylindrical section 9 with which it reaches through the recess 6 in the bearing pin 4. At an end facing an inner side 111 of the vehicle, the bearing pin 4 has an encircling collar 10 which is axially supported in the axial direction of the central axis 104 on the anti-friction layer 7, in particular on a limb 11 of the anti-friction layer 7 that is on the inside of the vehicle.

The encircling collar 10 is followed axially in the direction of the inner side 111 of the vehicle by a receiving device for the retainer device 2, which receiving device is designed, in the exemplary embodiment according to FIG. 2, as a projection 12. The projection 12 together with the encircling collar forms a step 13 on which the retainer device 2 sits by means of a corresponding recess 14.

Lying opposite the encircling collar 10, on the outside of the vehicle (outer side 110 of the vehicle) is a washer 15 which is placed against a second limb 16 of the cross-sectionally U-shaped anti-friction layer 7. Toward the outer side 110 of the vehicle, the washer 15 has convex beveled edge 17. A free end 18 of the bearing pin 3, which end is outside of the vehicle, is plastically deformed, in particular wobble-riveted, against the convex beveled edge 17.

The free end 18 therefore forms a funnel-like neck 19 which, in interaction with the washer 15 and the encircling collar 10, ensures that the bearing pin 4 is mounted in the actuating lever 3 captively in the axial direction with respect to the central axis 104.

Furthermore, the bearing pin 4 has a central passage opening 20 which has the central axis 104 as the central axis. At least in the region of the cylindrical section 9, the passage opening 20 has an internal thread 21 into which a fastening screw 22 can be inserted as the fastening means. Of course, the central passage opening 20 may be designed as a continuous opening or else as a blind hole opening.

The fastening screw 22 is particularly preferably assigned a washer 23 which has tooth-like projections 24 around its edge. The dimensions of the fastening screw 22, of the washer 23 and of the projections 24 is such that the retainer device 2 can be pressed against a free end surface 25 of the encircling collar 10 by means of the fastening screw 22 and the washer 23 such that the retainer device 2 is connected fixedly to the bearing pin 4 in the axial direction.

In a particularly preferred manner, the distance d of the step 13 from the central axis 104 is not constant, seen in the circumferential direction. The corresponding recess 14 of the retainer device 2 is preferably matched to the circumferential contour of the step 13 such that a rotationally fixed, form-fitting seat of the retainer device 2 on the bearing pin 4 is ensured. For example, the step 13 can have, at one or more points, flattened portions which interact with corresponding regions of the recess 14 thereby preventing rotation of the retainer device with respect to the bearing pin 4. Furthermore, the recess 14 is preferably designed in the vertical direction of the vehicle (z direction) as an elongated hole such that the cover can be set and adjusted in the vertical direction relative to the adjustment mechanism.

In the case of the connector device 1 according to the invention, it is particularly advantageous that the installation direction 26 of the fastening screw 22 is directed from the inside to the outside of the vehicle such that a clearance does not have to be retained for this purpose on the outer side of the vehicle. This makes it possible to design a polyurethane foam cladding which may be present, or another covering of the cover (not shown) in the region of the connector device 1, to be continuous such that an additional plastic paneling part or an undesirable thinning of the polyurethane foam cladding can be avoided. Furthermore, it is advantageous in the invention that just one fastening point is required and, for example, an alignment of the retaining plate, as required in the prior art, in order to be able to screw in both fastening screws can be avoided. Overall, fewer parts have to be handled for the installation, and therefore the installation is simplified. By means of the pivotable mounting of the pin in the actuating lever, components can therefore be saved and the overall construction can be considerably simplified. In particular, covers which have an encircling, continuous foam cladding, in particular in the region of the connector device 1 for visually covering the kinematic actuating mechanism, can also be fitted in a simple manner.

The invention claimed is:

1. A connector device on a retainer device configured for connection to a cover of an openable vehicle roof and a kinematic actuating mechanism, comprising:
   an actuating lever, with a bearing pin, having a central axis, about which the actuating lever is mounted pivotably relative to the retainer device, wherein the bearing pin is mounted rotatably with regard to the actuating lever and, on a region facing an inner side of a vehicle, has a receiving device for the retainer device, the retainer device being connected by a fastening means to the receiving device in a rotationally fixed and axially fixed manner with regard to the bearing pin.

2. The connector device of claim 1, wherein the bearing pin is mounted captively in the actuating lever.

3. The connector device of claim 1, wherein the bearing pin is wobble-riveted at an end facing an outer side of the vehicle.

4. The connector device of claim 1, wherein the actuating lever has an anti-friction plastic layer, which interacts with the bearing pin.

5. The connector device of claim 4, wherein the anti-friction layer is U-shaped in cross section and is designed as an injection-molded encapsulation of a bearing opening of the actuating lever.

6. The connector device of claim 1, wherein the bearing pin has a central passage opening with an internal thread for receiving the fastening means.

7. The connector device of claim 1, wherein the bearing pin has, as the receiving device for the retainer device, a projection which corresponds to a plug-in opening in the retainer device.

8. The connector device of claim 7, wherein the projection interacts in one direction of rotation about the central axis with the plug-in opening in a form-fitting manner.

9. The connector device of claim 7, wherein the projection has at least one flattened portion, and the plug-in opening is designed as a corresponding shaped opening such that the retainer device sits in a rotationally fixed and form-fitting manner on the projection.

10. The connector device of claim 7, wherein the plug-in opening is designed in the vertical direction of the vehicle, as an elongated hole.

11. The connector device of claim 1, wherein the retainer device is an inner cover panel.

12. A connector device on a retainer device configured for connection to a cover of an openable vehicle roof and a kinematic actuating mechanism, comprising:

an actuating lever, with a bearing pin, having a central axis, about which the actuating lever is mounted pivotably relative to the retainer device, wherein the bearing pin is mounted rotatably with regard to the actuating lever and, on a region facing an inner side of a vehicle, has a receiving device for the retainer device, the retainer device being connected by a fastening screw to the receiving device in a rotationally fixed and axially fixed manner with regard to the bearing pin, and wherein the bearing pin has a central passage opening with an internal thread for receiving the fastening screw.

* * * * *